(87.)
P. FERGUSON & F. G. BATES.
Improvement in Friction Clutch.
No. 122,822.                                 Patented Jan. 16, 1872.
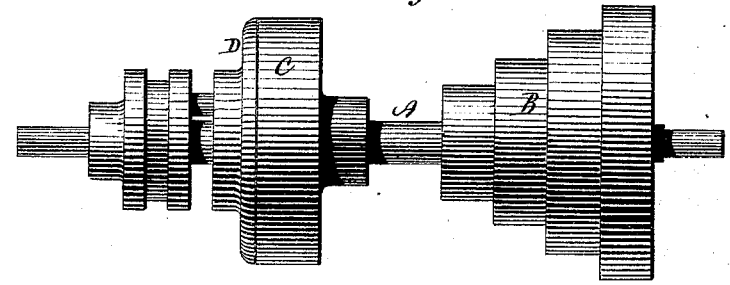
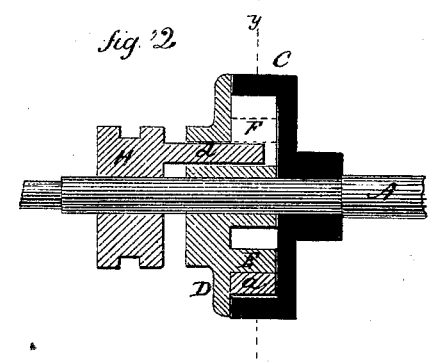
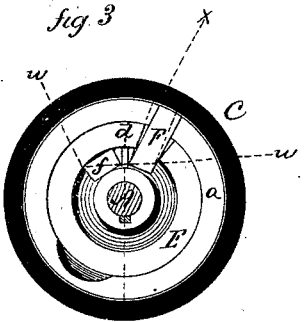
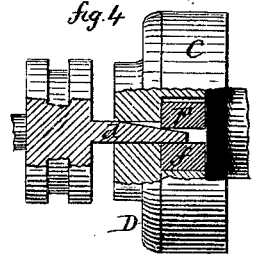
Witnesses.
Peter Ferguson &
Francis G. Bates
Inventor
By Atty.

UNITED STATES PATENT OFFICE.

PETER FERGUSON, OF NEW HAVEN, CONNECTICUT, AND FRANCIS G. BATES, OF SPRINGFIELD, MASSACHUSETTS.

IMPROVEMENT IN FRICTION-CLUTCHES.

Specification forming part of Letters Patent No. 122,822, dated January 16, 1872.

*To all whom it may concern:*

Be it known that we, PETER FERGUSON, of New Haven, in the county of New Haven and State of Connecticut, and FRANCIS G. BATES, of Springfield, county of Hampden and State of Massachusetts, have invented a new Improvement in Friction-Clutch; and we do hereby declare the following, when taken in connection with the accompanying drawing and the letters of reference marked thereon, to be a full, clear, and exact description of the same, and which said drawing constitutes a part of this specification, and represents in—

Figure 1, a side view of a shaft and pulleys with the clutch applied; Fig. 2, a longitudinal central section through the clutch on line $x\, x$ of Fig. 3; Fig. 3, a transverse section on line $y\, y$ of Fig. 2; and in Fig. 4, a section on line $w\, w$.

This invention relates to the construction of a clutch to engage loose pulleys with the shaft on which they run, and is alike applicable to other purposes for which a clutch or brake is required, such device being commonly termed machinery-clutch; and it consists in the arrangement of a divided ring within the rim of the pulley or revolving wheel, which said ring is fitted to a plate so as to be entirely disconnected from the said rim, and provided with a lever actuated to spread the said divided ring to engage the internal surface of the said rim, so that both the said rim and plate may be made to revolve together, or one to revolve while the other remains stationary.

A is a shaft, upon which are arranged cone-pulleys B, here represented simply for illustration. On the said shaft A a loose pulley, C, is arranged, the said pulley being constructed with an open chamber upon one side, within which a divided ring, $a$, is arranged, of slightly less diameter than the rim, as seen in Figs. 2 and 3. The ring is set upon a plate, D, which said plate is keyed fast to the shaft, a flange, E, being formed on the said plate for the support of the ring. At the division of the ring and through the flange E a lever, F, is arranged, as seen in Fig. 3, so that by the turning of the said lever to the right or left the ring $a$ will be expanded to fill the rim of the pulley, and this expansion is produced by means of a sleeve, H, on the shaft, which slides longitudinally, and from which an arm, $d$, extends through the plate D against the said lever F, as seen in Figs. 3 and 4, the said arm having inclined or wedge-shaped sides, so that when the arm $d$ is forced inward the lever will be turned or pressed out of its line of rest, as denoted in broken lines, Fig. 3, which expands the ring to closely fill the rim of the pulley, creating sufficient friction to cause the pulley and plate to revolve together, which (the plate being keyed to the shaft,) causes the shaft to revolve with the pulley so long as the ring is held expanded, but so soon as the arm $d$ is removed to allow the ring to contract, which it does by its own elasticity, then the plate and shaft remain stationary, while the pulley continues to revolve. A bearing, $f$, is arranged within the flange D to support the side of the arm opposite the lever. This arrangement dispenses with the necessity of the tight-and-loose pulley usually employed, and, consequently, with the wear and tear of the belts occasioned in shifting from a tight to a loose pulley. While we have illustrated this invention as applied to the loose pulley of a shaft, it will be evident to those skilled in mechanics that this invention may be applied as a brake to revolving wheels, the plate or divided ring being held stationary and in the same relative position to the revolving wheels as here described. We, therefore, do not confine the invention to any particular purpose or exact arrangement.

*Claim.*

The herein-described machinery-clutch, consisting of the divided ring $a$ on the plate D and within the rim C, combined with the lever F and sliding arm $d$, operating to engage or disengage the said plate D with or from the said rim C, substantially as described.

PETER FERGUSON.
FRANCIS G. BATES.

Witnesses:
A. J. TIBBITS,
J. H. SHUMWAY.

(87)